March 21, 1950
W. H. COLBERT ET AL
2,501,563
METHOD OF FORMING STRONGLY ADHERENT METALLIC
COMPOUND FILMS BY GLOW DISCHARGE
Filed Feb. 20, 1946
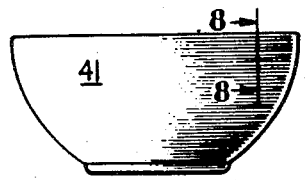
Fig. 7
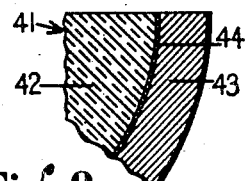
Fig. 8
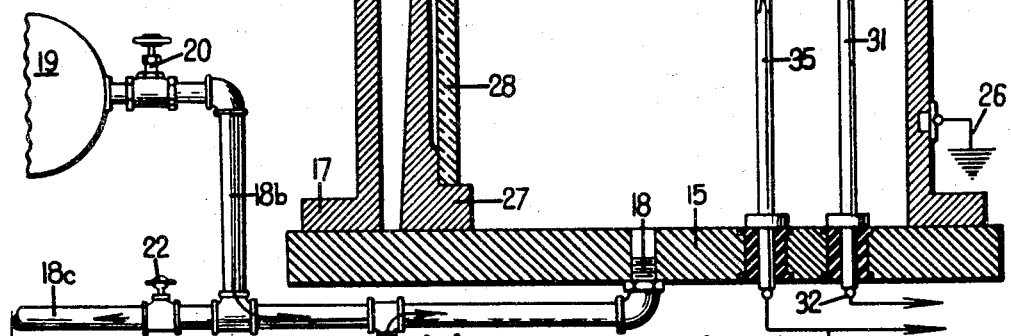
Fig. 1
  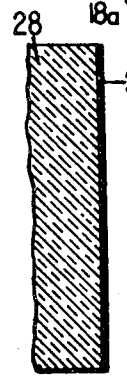 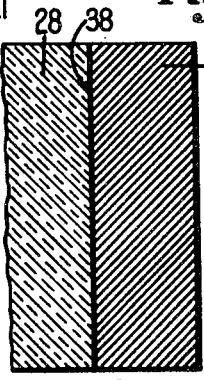 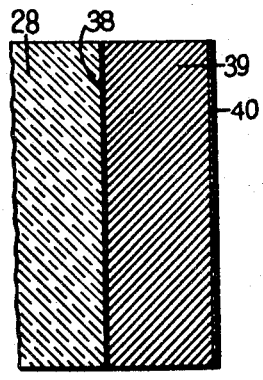
Fig. 2   Fig. 3   Fig. 4   Fig. 5   Fig. 6
INVENTORS
William H. Colbert.
Arthur R. Weinrich.
Willard L. Morgan.
BY Corbett, Mahoney & Miller
ATTORNEYS Patented Mar. 21, 1950

2,501,563

UNITED STATES PATENT OFFICE 2,501,563

METHOD OF FORMING STRONGLY ADHERENT METALLIC COMPOUND FILMS BY GLOW DISCHARGE

William H. Colbert and Arthur R. Weinrich, Brackenridge, and Willard L. Morgan, Haverford, Pa., assignors to Libbey-Owens-Ford Glass Company, Toledo, Ohio, a corporation of Ohio Application February 20, 1946, Serial No. 649,076

1 Claim. (Cl. 117—107)

This invention relates to a method of forming strongly adherent metallic compound films by glow discharge. It has to do particularly with a method of producing coatings of a high degree of adhesion, such as metal or reflective coatings upon support materials, such as metals, glass, porcelain, silica, mica, or other silicates or silica-containing surfaces by the use of a relatively thin layer of an oxidized metallic compound, such as a metallic oxide, or sulfate, as the adhesive in the application of reflective or other types of coatings, such as metallic coatings, on these materials. It also has to do with the method of producing the oxidized coating or film and the metallic coatings referred to. The present application is a continuation-in-part of our copending application Serial No. 541,965, filed June 24, 1944 (now abandoned).

Reflective articles, such as mirrors, are commonly made by the application to glass of metal reflective materials, such as copper, silver, gold, aluminum, chromium, platinum and rhodium. Most of these materials do not actually adhere to the glass and in forming mirrors, such as silver mirrors, the silver is not at all stuck to the glass in intimate contact largely by the pressure of the atmosphere. Consequently, any localized force removes the mirror layer, such as aluminum, silver, copper, or gold away from the surface, causing pin holes and finally "let-goes" or "blisters" throughout the mirror. In such cases the utility of the mirror is destroyed and it rapidly disintegrates. While attempts have been made in the past to protect such mirror coatings on glass from the effects of the atmosphere and more particularly from abrasion and rubbing of the mirror film off the glass, these attempts have generally followed the direction of applying a protective lacquer or shellac coating. Such coatings, or paint coatings which are also used, however, tend to contract during the drying and formation of the protective coating film and they further contract and expand with the humidity in the atmosphere. Such contractions or expansions in the protective films are sufficient to cause localized strains or pulling effects and often the use of such lacquers or other coatings, rather than resulting in an increase in the life of the mirrors, has been found to lead to an early destruction of them by pulling the mirror coating away from the glass.

We propose to overcome the difficulties arising from lack of adhesion within glass or other mirrors and the similar difficulties experienced with many other coatings applied to glass for other purposes, such as metal coatings deposited upon glass supports in order to produce, for example, photoelectric surfaces or electrical resistances, as well as articles of manufacture whose body portions are formed from siliceous material. We have found that various metallic compounds in contrast to the metals are highly adherent to glass and other materials and that relatively thin layers of these, which are adherent to metal coatings to be applied to glass, can be used to secure highly adherent products, exhibiting the normally desired optical, electrical, or other properties without any, or at least without material or serious, change.

We have found that the metallic oxides which are reactive with silica, such as those of lead, silver, aluminum, magnesium, zinc, thorium, and other rare metal earth oxides, and the oxides of cadmium, antimony, bismuth, mercury, copper and other heavy metal oxides, when applied over glass or other siliceous surfaces, are extremely highly adherent to such surfaces and that furthermore they are highly adherent to the metals which may be applied to glass or other materials either by chemical deposition, thermal evaporation, sputtering, or other means, for the purposes of securing mirrors or various other coated articles. Additionally we have found also that other metallic compounds may be used as adhesive layers between a metal coating and a silica-containing surface, such as glass. Thus, the metallic compounds which may be looked upon as derivatives of the metallic oxides are generally highly effective and we may use the selenates, sulfates, tungstates or other compounds related to the metallic oxides which have been indicated above and derived from the indicated metals. While with ordinary metal coated mirrors the coatings can readily be removed from the glass support by applying adhesive tape to the same and pulling this off, it is found that with our new coated articles, the adhesive tape will not pull the mirror films away from the glass for the reason that they are so tightly adhered to the same by our intermediate relatively thin adhesive layers. Furthermore, with our new mirrors and various other coated articles made in accordance with our method, a remarkably improved resistance to moisture is found so that they will withstand, in an unprotected condition, salt spray and humidity tests for considerable periods of time, whereas with the ordinary mirrors and coated articles, the water quickly works between the mirror films and the glass on which they lie and removes the films from the glass. In a similar way the separation difficulties experienced due to tensional pull when protective lacquer, paint or shellac coatings are applied on the back of the mirrors, have been overcome, since our reflective coatings are adhered sufficiently tightly to the glass or other support material to resist such tensional effects. This affords us a further advantage in that we may now apply, for the purposes of protecting mirrors from corrosive gases such as sulfides, protective coatings of a maximum resistance to atmospheric effects without regard to the coating being one free of tensional pull.

The metallic oxides or other metallic compounds applied as adhesive films need be, and in some cases preferably are, very thin, being only a few molecules thick in some cases and not visible or otherwise detectable. We have found that the thickness of layer necessary to develop adhesive forces needs to be only a few molecules thick and as such, the presence of these compounds on the glass may not be detectable by any optical effect. Thus, where we use extremely thin films of oxides or other compounds for the purpose of securing highly adherent mirrors, the mirrors produced by depositing silver, or other suitable metal on the glass first covered with a very thin metallic oxide film, are equal in reflectivity and in transmission to similar mirrors made without the relatively thin oxide or other metallic compound adhesive films. However, we may also use thicker metallic oxide or metallic compound films as an adhesive layer which may even be detected by the slight color they impart to the glass or other support material and which may also cut down the reflectivity or transmission of light to some degree in the final produced article. Thus, for example, with a mirror, it is apparent that if our adhesive layers are too thick, the reflectivity properties of a second surface mirror may be seriously or desirably cut down but at the same time it is apparent that the reflection properties of the first surface mirror made in such a way would not particularly be influenced by the thickness of the oxide or adhesion-securing layer. The metallic oxide or metallic sulfide or other metallic compound may be deposited as a coating on the glass or other support material by the direct thermal evaporation under normal conditions or within a vacuum, of extremely small amounts of the desired metallic compound. This may be carried out in accordance with the disclosure of copending application Serial No. 541,964, filed June 24, 1944 (now Patent No. 2,482,054).

We have found that in the case of oxide layers, we may produce these in position on the glass within the vacuum chamber by oxidation of extremely thin metallic layers first deposited thereon by thermal evaporation. Thus, we may first evaporate very small amounts of aluminum, tin, lead or copper and then form these into the metallic oxides while on the glass surface by electrical glow discharge of these deposits within an oxygen or air atmosphere. As examples of the compounds we may directly evaporate onto the glass surface by thermal evaporation within a vacuum, we may use lead oxide, cadmium oxide, zinc oxide, zinc sulfide, lead sulfide, antimony oxide, aluminum oxide, or lead tungstate. We may readily form coatings of lead sulfate on glass or other support materials by first evaporating extremely small amounts of lead sulfide and thereafter oxidizing this on the support material to lead sulfate by electrical glow discharge in an oxygen or air atmosphere within the vacuum chamber. Other oxidized compounds such as selenates, tellurates and phosphates are readily prepared by oxidation of a thin deposit and such oxides or other oxidized metallic compounds thus prepared may be used to secure strongly adherent coatings of other metals or materials of a reflective nature thereafter deposited within the same vacuum chamber by thermal evaporation.

One of the objects of our invention is to provide an improved method or process whereby a surface coating, such as a reflective or a metallized surface coating, is caused to firmly and substantially permanently adhere to a support material or supporting surface formed, for example, from glass or other siliceous materials, or from metals, plastic, cellophane, resins, paper, et cetera.

Another object of our invention is to provide an improved method or process whereby a transparent, semi-transparent, or opaque coating of metal, is caused to firmly and substantially permanently adhere to any one of the above-mentioned support materials or supporting surfaces.

A further object of our invention is to provide an improved method or process for producing a coated support material or supporting surface in which the surface coating such, for example, as a metal surface coating, is caused to adhere firmly to the support article by virtue of the provision of an interposed or intermediate film or coating; another object being to provide a method wherein the interposed or intermediate film or coating is transparent and has no optical effect.

A further object of our invention is to provide an improved method or process whereby articles may be provided with strongly adherent surface coatings and in which the surface coatings are provided with protective films.

A further object is to provide a method whereby the adhesive and protective layers of oxidized metallic compounds for metallized articles may be produced readily within a vacuum by oxidation brought about through electrical glow discharge.

The foregoing and other objects and advantages of our invention will appear from the following description and appended claims when considered in connection with the accompanying drawings forming a part of this specification wherein like reference characters designate corresponding parts in the several views.

In said drawings:

Fig. 1 is a vertical sectional view, partly in elevation, showing one type of apparatus with which the method or process of the present invention may be performed.

Fig. 2 is a vertical sectional view, partly broken away, illustrating a piece of support material employed in performing the method of our invention.

Fig. 3 is a view similar to Fig. 2 showing the application to one face or surface of the support material, of an adherent layer of material to be oxidized, and illustrating one step of our method.

Fig. 4 is a view similar to Fig. 3 and illustrating a further step of our method and showing the adherent layer of material after oxidation.

Fig. 5 is a vertical sectional view, partly broken away, and showing an article produced in accordance with our invention and illustrating another step of our method.

Fig. 6 is a view similar to Fig. 5, showing the article of Fig. 5 after a protective film of material has been applied to the surface coating thereof, and illustrating another step of our method or process, as well as a new article of manufacture produced thereby.

Fig. 7 is an elevational view of a piece of ware, such as a bowl, formed from siliceous material and made in accordance with our invention; and Fig. 8 is an enlarged fragmentary vertical sectional view taken substantially along the line 8—8 of Fig. 7, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation and it is not intended to limit the invention herein claimed beyond the requirements of the prior art.

Referring now particularly to Fig. 1 of the drawings, we have illustrated therein a suitable apparatus for performing or carrying out the method of our invention to produce the improved articles of manufacture also embodying the invention, as disclosed and claimed in our copending application Serial No. 541,965, filed June 24, 1944 (now abandoned).

The apparatus comprises a base 15 upon which is removably mounted a housing or bell-like casing 16 having at its lower end a surrounding projection or flange 17 which rests upon the top surface of the base 15. The base 15 is, as shown, provided substantially centrally thereof with a combined intake or exhaust pipe or conduit 18 which is in communication, through a pipe extension 18c with suitable pumps (not shown) for evacuating the chamber formed by the base and housing and for creating a vacuum therein. The pipe or conduit 18 is also in communication, through a branch pipe 18b, with an oxygen tank 19, the branch pipe having a control valve 20 provided therein. The pipe or conduit 18 is also in communication, through another branch pipe 18a, with a source of air supply (not shown), the branch pipe 18a being provided with a control and shut-off valve 21. It is to be noted that the pipe extension 18c is likewise provided with a control and shut-off valve 22.

It is to be understood that by reference to "air" we mean, of course, a gas which is approximately one-fifth oxygen; in other words, an oxygen-containing atmosphere.

Insulatingly mounted in the dome-like portions of the housing 16 is an electrode 23, preferably made of aluminum, carried by a vertical stem 24 which is connected, through a suitable wire or conduit 25, with a source of D. C. or A. C. electric current. The electrode or plate 23, as shown, is preferably round or circular although this electrode may be formed in any desired shape. The walls of the housing 16 provide the other electrode for the apparatus, the side wall adjacent the bottom thereof being grounded at 26 by any suitable electrical connection. This electrode may be either positive or negative if D. C. current is used.

Located upon the top surface of the supporting base 15, as shown, is a suitable support 27 provided for the purpose of supporting in upright position a piece of support material, such as glass or the like 28.

Positioned within the chamber and located, as shown, adjacent a side wall of the housing 16, is an electrically energizable tungsten filament or coil 29 whose opposite ends are mounted upon adjustable brackets 30 slidable on upright supporting posts 31 which are insulatingly mounted in the base 15, one such post only being shown. The posts 31 and the filament 29 are electrically connected through a wire or conduit 32 to a suitable source of electric current.

Also located within the chamber and adjacent the filament 29, is a second electrically energizable tungsten filament or coil 33 whose opposite ends are connected to brackets 34 which are adjustable lengthwise on vertically disposed supporting posts 35, one such post only being shown. The posts 35 are insulatingly mounted in the base 15 and are connected through a wire or conduit 36 with a suitable source of electric current.

In accordance with our method, a piece of support material, such as the plate 28, is mounted upon the support 27. The housing 16 is then placed in position upon the base 15 and the chamber formed thereby is evacuated of air discharged through the pipe or conduit 18 and branch pipe 18c through the operation of pumps (not shown) to produce a relatively high vacuum within the chamber. It will be understood that one of the suitable materials or metals above referred to as useful as an oxidized coating has been applied in any suitable manner to the tungsten filament 29. Current is then supplied to the filament to cause the thermal evaporation of the metal or material carried by the filament to cause molecules thereof to be thrown off and deposited upon the face of the support material 28 to produce a layer of metal or metallic compound such as that shown at 37 in Fig. 3.

The valve 22 may be closed or preferably is left open to maintain a vacuum of a desired degree in the chamber, it being understood that the valve 21 leading to the air supply is closed. The valve 20 is now opened to admit oxygen from the tank 19 through the branch pipe 18b and the pipe 18 to the chamber, whereupon the electrode 23 is energized to cause an electric glow discharge and bombardment of the coating layer 37 and with the oxygen present in the chamber, to oxidize the layer to produce the oxidized metal or oxidized metallic compound layer 38 shown in Fig. 4. This oxidation of the metal or metal compound layer 37 may be effected, if desired, by manipulating the proper valves to admit some air through the branch pipe 18a and the pipe 18 to the chamber instead of admitting oxygen thereto while at the same time the electrode 23 is energized to cause an electric glow discharge through the air and bombard the layer and to thus produce the oxidized layer of metal or metallic compound 38. The use of oxygen as described is, however, preferable since the process of oxidation is more rapid in the presence of oxygen. The presence of oxygen or air during the electric glow discharge is such that the electrical discharge may occur, for example, between 1.00 and 0.01 millimeter.

After the oxidized layer 38 has been formed upon the support material 28, the chamber is further evacuated to rebuild the vacuum therein, whereupon metallic pieces, such as silver, aluminum, or the like which have been applied to the filament 33, are evaporated by energizing said filament to cause molecules of the metal thereon to be deposite by thermal evaporation upon the oxidized layer 38 to produce a metallic or reflective surface layer or coating, such as the layer or coating 39 shown in Fig. 5. The coating 39 may be of any desired character depending upon the metal or other material evaporated by the filament 35, and in the case of forming a mirror of such nature as to give the desired optical properties.

In accordance with our method, it is often further desirable to provide the coating 39 with a protective film, such as the metallic oxide or other oxidized metallic compound film 40 shown in Fig. 6 and the means of producing such a film constitutes part of this invention.

To produce the protective film 40 upon the surface of the coating 39, oxygen or air is admitted to the chamber and the electrode 23 energized to effect, by electrical glow discharge and bombardment, the rapid oxidation of the top surface of the coating 39. It is to be understood that the oxidizing process provides the protective film 40 in the surface of the coating 39 and that said film penetrates said coating for a portion of its depth and thus becomes an integral and homogeneous part of the coating. In other cases the film 40 may be formed by further evaporation of material from filament 30 or of a further material from a third filament (not shown) and thereafter oxidizing by electrical glow discharge as in the step taken in forming coating 38.

It is to be further understood that the adherent layer 38 which causes the coating 39 to adhere firmly to the support material 28 and the protective film 40 are preferably transparent and that the layer and said film are not discernible and have no optical effect. On the other hand coatings 39 and/or 40 may be thicker if desired and may be visible and may actually be employed to alter the optical properties of the mirror as well as to secure adhesion and/or protection.

From the foregoing it will be seen that we have provided an improved method or process for producing new articles such, for example, as mirrors or reflectors in which each of the articles comprises a body portion or base of some suitable support material such as those described above, an adherent coating 39 of any of the materials heretofore mentioned and an intermediate layer, preferably oxidized to cause the firm adherence of the coating to the support material, which may further be preferably coated with an oxidized protective film for the outer surface or face of the coating.

Referring now particularly to Figs. 7 and 8, in these figures we have shown a piece of ware, such as a bowl 41 whose body portion is formed from porcelain, opaque glass, or other suitable material. The body portion 42 of the bowl is preferably provided with a metallic surface coating formed from gold or the like and shown at 43 in Fig. 8. This surface coating is caused to adhere firmly to the body portion 42 by the provision of an intermediate adhering layer 44 which may be formed from lead sulfate, or other oxidized metallic compounds, for example, lead oxide, or the like. If desired, the outer surface or face of the coating 43 may have a protective film (not shown) applied thereto. The bowl 41 is preferably produced in an apparatus similar to that shown in Fig. 1 of the drawings by a process similar to that described above.

While we have shown, merely by way of illustration, a bowl 41, it will be understood that our method and process is equally applicable to the production of coated earthenware or porcelain articles or objects of various kinds, shapes and sizes.

*Example 1*

By way of example, a silver mirror was made in which 0.007 gram of aluminum was evaporated within a vacuum from a tungsten coil onto glass supports set at 12 inches from the tungsten coil and at 24 inches away. The aluminum deposit on the glass 12 inches away from the tungsten burner was 0.0023 micron thick while that formed on the glass 24 inches away from the tungsten burner was obviously thinner and 0.0006 micron thick. These aluminum deposits were then converted into aluminum oxide by introducing oxygen into the vacuum until a pressure of 0.01 to 0.02 millimeter was developed and then an electric glow discharge of 15,000 volts A. C. and 3 kva. was caused to pass through the vacuum chamber and to play upon the surface of the glass. This rapidly converted the thin aluminum films into aluminum oxide, 5 minutes being entirely sufficient to do this. These films would appear to be about 0.0030 and 0.0008 micron thick. The oxygen supply was then shut off and after the vacuum pumps again secured a vacuum of 10 to the minus 5 millimeters, there was evaporated from other tungsten coils or filaments approximately 5.9 grams of silver, which gave a deposit upon the glass placed 24 inches away of 0.1 gram of silver per square foot of area, and a deposit 4 times as thick again on the glass placed 12 inches from the burners or filaments. The silver layer thus produced on the glass placed 24 inches away was approximately 0.1050 micron thick. As first surface mirrors, each was of 95 to 96 per cent reflectivity. As second surface mirrors the two mirrors produced showed a reflectivity of 91 per cent in the latter case and the mirror made 12 inches away from the tungsten electrodes and having a slightly thicker aluminum oxide layer on the glass, showed a reflectivity of 88 per cent. A reflectivity of 91 per cent is the maximum secured with a second surface silver mirror made by thermal evaporation and not using our oxide layers on the glass. Moreover, it is to be understood that good adhesion was secured, the deposits not being removed from the glass by adhesive tape in contrast to the easy stripping secured with ordinary silver mirrors. Similar strongly adherent silver mirrors may be produced upon a polished sheet of aluminum by substituting it in the above operations for the glass plate.

*Example 2*

A silver mirror was made by first evaporating within a high vacuum 0.011 gram of silver onto a glass placed 24 inches away from the tungsten filament. This gave a silver coating 2.2 Angstrom units thick or 0.00022 micron thick. The silver was then converted into an invisible silver oxide film by introducing air or oxygen preferably up to a pressure sufficient to permit an electric glow discharge to occur within the vacuum chamber. After several minutes' operation of the glow discharge the silver film was converted into silver oxide. Thereafter the chamber was again highly evacuated and from other tungsten filaments, sufficient silver was evaporated to give a silver coating on the glass of 0.1 gram per square foot. This silver mirror showed extremely high adhesion and the coating could not be removed from the glass by adhesive tape. The reflectivity of the mirror either as a first surface or a second surface mirror was equal to that of a silver mirror, namely, 95 to 96 per cent as a first surface and 91 per cent as a second surface mirror. The coating of silver oxide thus used is only 1 to 2 atoms thick, being approximately 3.3 Angstrom units thick. Obviously, the thickness of this film is negligible compared to the dimensions of visible light rays which in the yellow measure 5000 Angstrom units. Consequently, it is not surprising that such a deposit as was used in this example had no optical effect, while exerting a desirable high increase in adhesion.

Example 3

A quantity of lead comprising 0.0076 gram was evaporated from a tungsten or platinum filament onto a piece of glass 24 inches away within a high vacuum chamber. Air or oxygen was then admitted to the chamber to between 1 and 0.01 millimeter pressure and then an electrical glow discharge through such oxygen containing atmosphere was carried on from 5 to 10 minutes. This converted the initially deposited lead coating on the glass to one of lead oxide approximately 0.0002 micron thick. This coating could not be seen nor did it affect the light transmission of the glass. Without removing the glass from the vacuum chamber there was then evaporated on to such coated glass after again evacuating to a higher vacuum 8.6 grams of silver. There was thus produced a silver mirror adhered to the glass by the lead oxide film. In similar runs with the vacuum chamber the same, first a coating of lead oxide was formed in the same way and thereafter there was evaporated 2.2 grams of aluminum or 7.25 grams of copper or 5.8 grams of chromium by thermal evaporation. In each case the first and second surface mirrors showed the normal characteristic reflection values and properties of the ordinary mirrors made with these metals not having the lead oxide film. In each case, however, the mirrors were very tightly adherent, and in each of these mirrors the lead oxide film next to the glass was 0.0002 micron thick and the metallic reflective layers were 0.1750 micron thick.

Example 4

Using a lead oxide coated plate produced as just above, there was deposited on such a piece of glass sufficient silver to produce a coating of .04 gram per square foot and of about .040 micron thickness. This gave a semi-transparent mirror showing a reflectivity of 84% and a light transmission of 9%, which is identical with that secured in similar deposits on glass without the lead oxide coating. The silver mirror produced was tightly adherent.

Example 5

Working within a high vacuum chamber with the glass piece placed 14 inches away from the tungsten heater filaments there was evaporated onto the glass 0.004 gram of lead by thermal evaporation within the vacuum chamber. Oxygen was then admitted into the chamber in sufficient quantity to permit an electrical glow discharge within the chamber when 30,000 volts was applied to the same. After a few minutes the lead was converted to lead oxide. The lead film, before converting to the oxide, was about .0022 micron thick and the lead oxide film should have been about .0029 micron in thickness. When this was coated with silver by thermal evaporation sufficient to give a deposit of 0.1 gram per square foot, the second surface reflectively of the silver mirror produced was 91%. In this case no loss in reflectivity was experienced although an extreme improvement in adhesion was secured. We may also apply the silver layer by sputtering silver onto the lead oxide coated sheets. Similar results are secured if the lead oxide coated sheets are silvered or mirrored by ordinary chemical deposition methods, as by pouring an alkaline mixture of silver nitrate and invert sugar on the precoated sheets.

Example 6

Whereas the lead oxide films used in the above examples were invisible with the glass piece placed 14 inches away from the tungsten heater filament a lead oxide film similarly produced at this distance in the same vacuum chamber by the evaporation of a greater quantity of lead, namely, 0.015 gram of lead, was visible as a very slight yellowish tinge upon the glass. When silver to the amount of 0.1 gram per square foot was deposited upon this coating by thermal evaporation, the reflectivity of the first surface mirror was the normal 95 to 96%, but the second surface silver mirror produced was found to be of 85 per cent reflectivity. Thus, the lead oxide film which was about .0108 micron thick did in this case decrease the reflection from the second surface but its use gave a tightly adherent mirror giving improved salt spray test resistance when properly backed. By the use of even thicker films of lead oxide there is not found any further improvement in adhesion but as the lead oxide films become thicker there is a greater absorption of light. Thus, evaporating 0.036 gram of lead and converting this into lead oxide, gave a lead oxide film of 0.0260 micron thickness and there was a distinct yellowish color produced upon the glass. When this was then coated with silver to the amount of 0.1 gram per square foot, the silver mirror produced had a second surface reflectivity of 77 per cent. In producing the lead oxide films in this example, the lead was converted to lead oxide by operating an electric glow discharge in an oxygen or air atmosphere within the chamber surrounding the lead coated plates at 0.02 millimeter for about 20 minutes.

Example 7

A particularly adherent mirror suitable for outside use as store fronts was produced by the deposition upon an opaque colored vitrolite glass at a distance of 14 inches away from a tungsten filament of 0.005 gram of tin to give a coating of 0.000,292 gram per square foot or of 0.000,000,314 gram per square centimeter. The tin was then converted into oxide by exposing the coated plate without removing it from the vacuum chamber to an electric glow discharge in an oxygen or air atmosphere at around 0.02 millimeter pressure. On top of this tin oxide layer which was about 5 Angstrom units thick there was deposited 3.5 grams of chromium to give a mirror which had all the optical properties of an ordinary chromium mirror of the same chromium thickness. The thickness of the chromium layer in this case was 0.1060 micron. This was completely etched away by known methods in portions to present the chromium mirror and colored glass in contrasting design.

Example 8

An ordinary piece of glass was coated when placed 24 inches from the burner by evaporating in a high vacuum directly upon the piece of glass, lead sulfide in the amount of 0.025 gram. After the evaporation, sufficient air or oxygen was let in to permit electrical glow discharge therein and after a few minutes of glow discharge the vacuum pumps were again started and aluminum was then thermally deposited as in previous Example 3. This gave an aluminum mirror in which the aluminum was adhered to the glass by a thin film of lead sulfate formed by oxidation of the lead sulfide. The lead sulfate layer would appear to have been of about 0.0011 micron thickness. The oxidation of the lead sulfide layer to lead sulfate is accomplished without removing the piece from the vacuum chamber, by introducing oxygen into the chamber after the lead sulfide has been deposited, until a sufficient pressure has been built up which will permit an electric glow discharge to pass through the gases within the chamber. After a short time the electric glow discharge, in combination with the oxygen present, converts the lead sulfide to lead sulfate. The lead sulfate layer gave to the mirror produced a very high adhesion not found in the simple aluminum mirror although the optical reflection properties were entirely normal from both the first and second surfaces.

Example 9

As a further example, 0.002 grams of zinc was evaporated from a tungsten filament onto a borosilicate glass such as "pyrex," placed 14 inches away from the tungsten burner. Oxygen was then introduced to produce a pressure between 1 millimeter and 0.02 millimeter, and electric glow discharge was set up between an aluminum electrode in the center of the chamber and the walls of the chamber, by the application of 5,000 to 30,000 kva. After a few minutes' operation of the glow discharge, the extremely thin deposit of zinc was converted into a zinc oxide layer of about 0.0004 micron thickness. A silver electrode was then energized by a high potential electric current so as to cause silver to be sputtered on top of the zinc oxide coated glass. After a sufficient amount of silver had been deposited the mirror coated glass or the like was found to be directly applicable for use as an electric resistance by attaching suitable conducting leads to this silver film. Pieces of this glass were also further coated by thermal evaporation preferably within the same high vacuum with a further layer of copper oxide to produce a photoelectric cell when suitably mounted within a case and when the conducting silver backing of the copper oxide was attached to the electrically conducting leads. Quartz may have been coated in a similar way as the support material in place of the borosilicate glass.

Both of the articles produced as just described in Example 9 were found to be highly serviceable due to the high degree of adhesion secured, whereas in the past, it has not been possible to make such articles from silver although its high electrical conductivity made this desirable because the silver films in practical commercial use soon separated from the glass because of lack of adhesion.

Example 10

Another example, based on Example 9, is one in which after converting zinc to zinc oxide and depositing silver as described in Example 9, copper is then thermally deposited within the high vacuum and converted to copper oxide by electrical glow discharge within an oxygen or air atmosphere rather than being directly evaporated as copper oxide to give a photoelectric cell.

Example 11

On a porcelain bowl, such as that shown in Figs. 7 and 8 of the accompanying drawings, which may have been glazed, or not glazed, with a silicate, or which may be in the raw pottery condition, there was evaporated onto its surfaces while in a high vacuum, a thin transparent coating of zinc phosphide or of lead selenide. These coatings were then converted to zinc phosphate or lead selenate, respectively, by introducing air or oxygen into the vacuum chamber and causing an electric glow discharge to fall upon such surfaces for a short time dependent upon their thickness. A stencil was then placed on portions of the coating leaving other portions exposed and the bowl was again placed within the vacuum chamber and by thermal evaporation copper was evaporated thereon. Wherever the bowl was protected by the stencil material it was found to appear as originally but to have these in the thin transparent coating, but wherever it was left exposed the copper gave a contrasting reflective coating which was tightly adherent, due to the thin film of zinc phosphate or lead selenate.

Example 12

In a similar way, a lead sulfite layer was thermally deposited on a bowl in a high vacuum and thereafter air was introduced to build up a pressure to 1 millimeter, or a pressure between 1 millimeter and 0.01 millimeter. The film was then oxidized by glow discharge to form a layer of lead sulfate. Gold was then deposited by thermal evaporation all over the bowl and the highly reflective gold bowl secured showed a strong adhesion between the gold and the siliceous surfaces of the bowl by reason of the thin intermediate adhesive layer of lead sulfate. Normally gold deposits on porcelain or glass may be readily wiped off with the fingers but our adherent constructions such as in this example cannot be removed by strong rubbing.

Example 13

A rhodium mirror was made by thermal evaporation in the following manner. A glass plate was placed in the vacuum chamber 14 inches away from the tungsten filament and 0.010 gram of tin was evaporated onto the glass within a high vacuum. Oxygen was then introduced into the chamber sufficient to give an electrical glow discharge of a deep sea green color and the glowing was continued for 15 minutes to convert the coating completely into tin oxide, the layer of oxide produced being about 10 Angstroms thick. The high vacuum was then again secured by starting the vacuum pumps and rhodium was thermally evaporated to give a reflective mirror. In contrast to similar deposits of rhodium made directly onto glass which are of very poor adhesion and undependable, our mirrors were of high adhesion and high service life. The tin oxide coating was invisible and without any optical effect upon the reflectivities of the rhodium mirror.

Example 14

In Example 3 there was produced an aluminum mirror adhered to a glass support by a thin layer of lead oxide which was produced by evaporating a thin layer of lead, oxidizing this with an electric glow discharge in an oxygen containing atmosphere, and then thermally depositing metallic aluminum. If after the thermal deposition of the aluminum reflective layer oxygen or air is again let into the vacuum chamber to a pressure of about 0.5 millimeter sufficient to permit glow discharge therethrough and such electric glow discharge is then allowed to play upon the aluminum surface it is found to be converted into an aluminum oxide surface in its outer layers to a depth dependent upon the energy in the glow discharge and the time the glow is operated. Thus with a glow operating at 15,000 volts and 3 kva. for 30 minutes upon the aluminum mirror produced in Example 3 without taking the same from the vacuum chamber, there is produced a mirror of improved scratch resistance due to the layer of aluminum oxide produced on the surface of the mirror. Such layers are quite transparent and without important effect upon the reflectivity of the mirror.

Aluminum oxide layers may be used as the adhesion layers on the glass as produced in Example 1 upon which we may then deposit further aluminum by thermal evaporation to produce a reflective layer and then by a further step of electrical glow oxidation on the surface as just described give a protective aluminum oxide surface.

Example 15

Proceeding as in Example 1 a silver mirror adhered to glass or an aluminum metal support was produced by thermally depositing within a high vacuum a thin layer of aluminum which was then converted into aluminum oxide completely by an electrical glow discharge set-up in the vacuum chamber in an oxygen containing atmosphere. After increasing the vacuum silver was thermally evaporated as previously described. Following immediately after this within the same vacuum a further quantity of aluminum of 0.025 gram was evaporated from a third burner filament. The supports in this case were placed 12 inches from the filaments. Oxygen was then let into the chamber to about 1 millimeter and the electrical glow discharge was then operated for 30 minutes to convert this top layer of aluminum completely into transparent aluminum oxide. This gave a tightly adherent silver mirror comprising an aluminum oxide layer adjacent the glass or aluminum support of about 0.0030 micron thickness, an opaque reflective silver layer superimposed upon this and adhered thereto of about 0.4 micron thickness and on top of this there was a protective layer of aluminum oxide of approximately 0.0100 micron thickness.

Example 16

It is apparent that the metallic coating which is to be oxidized to form an oxidized metallic compound useful as an adhesive or protective layer may be formed by sputtering when we employ metals. Thus, instead of evaporating by thermal evaporation a small amount of copper there was formed a thin deposit of copper on a support material by placing the support within a vacuum chamber and sputtering a small amount of copper onto the surface of the support. In this case, the aluminum electrode was provided with a thin coating of copper and a high voltage, such as 15,000 to 30,000 volts, was impressed across the electrodes designated as in Figure 1 of the drawings to sputter all the copper off of the aluminum electrode. Oxygen was then introduced and the glow discharge again set up so as to oxidize the copper deposit upon the support to copper oxide. By means of another electrode (not shown) there was then set up a sputtering potential between this electrode of silver and the grounded walls which resulted in a metallic layer of silver being deposited by sputtering upon the copper oxide coated support. Oxygen was again introduced and the glow discharge between the aluminum electrode 23 and the grounded walls 26 so as to oxidize the surface of the silver superficially and to produce thereon a layer of silver oxide. In this manner there was produced a silver mirror which was strongly adherent to the support by reason of the copper oxide film and by reason of the silver oxide layer on its surface it showed an improved resistance to corrosion by sulfide and other atmospheric gases.

So that there can be no misunderstanding as to the use herein of the term "siliceous material," we submit below a definition of this term:

The adhesive effects are secured upon silica, silicates such as mica which contains silica, aluminum silicate or calcium silicate surfaces, and upon the various types of glass which contain different amounts of silica. Thus, with the lead glasses which have 30 to 60 per cent silica, with the optical glasses of 50 per cent silica or more, the ordinary lime glasses of around 65 to 75 per cent silica, and with the borosilicate glasses of as high as 80 per cent silica, we secure equally as good results as are found with pure silica. Likewise, the commercial porcelain and earthenware articles which contain varying amounts of silica in the ware or in the glazes provide suitable support bases to which metallic films may be adhered by use of our metallic compounds.

From the foregoing it will be seen that we have produced a new and novel method or process capable of producing metallized or reflective articles of manufacture which comprise a support material which may be of various kinds, having a firmly adherent surface coating formed from various metals or other materials, and closely adhered to the support material by an intermediate adhesive layer of an oxidized metallic compound and the surface coating may be protected by a protective oxidized metallic compound film which, when applied, may become an integral homogeneous part of the surface coating for a portion of its depth.

Having thus described the invention, what is claimed is:

The method of forming, in a single continuous operation by successive steps within a vacuum chamber, a laminar article comprising a vitreous siliceous support body, an oxidized metallic bonding layer permanently and directly bonded to a surface of said body, and a metal film permanently and directly bonded to said bonding layer, comprising the steps of: placing the support body in a vacuum chamber, evacuating the chamber to a vacuum suitable for thermal evaporation, depositing upon a surface of the body by thermal evaporation within the chamber a continuous layer of metal, terminating the step of deposition before the layer is sufficiently thick to be visibly detectable, introducing an oxygen containing gas into the chamber in an amount sufficient to reduce the vacuum to one suitable for glow discharge, subjecting the deposited layer to a glow discharge within the chamber to completely oxidize the layer to a solid metal oxide in intimate contact with and bonded directly to the surface of the body, and to maintain the surface of the bonding layer in a clean condition, then further evacuating the chamber to a vacuum suitable for thermal evaporation, and substantially immediately thereafter depositing by thermal evaporation upon the fresh, uncontaminated surface of the bonding layer a film of metal in intimate contact with and bonded directly to said bonding layer.

WILLIAM H. COLBERT.
              ARTHUR R. WEINRICH.
              WILLARD L. MORGAN.

REFERENCES CITED

The following references are of record in the file of this patent:

UNITED STATES PATENTS

| Number | Name | Date |
|---|---|---|
| 1,927,792 | Charlton | Sept. 19, 1933 |
| 2,030,476 | Smith | Feb. 11, 1936 |
| 2,143,723 | Walker et al. | Jan. 10, 1939 |
| 2,207,656 | Cartwright et al. | July 9, 1940 |
| 2,304,182 | Lang | Dec. 8, 1942 |
| 2,322,613 | Alexander | June 22, 1943 |
| 2,394,930 | McRae | Feb. 12, 1946 |